(12) United States Patent
Kim

(10) Patent No.: US 9,915,854 B2
(45) Date of Patent: Mar. 13, 2018

(54) ADJUSTABLE LIGHT FIXTURE WITH AN UMBRELLA MOUNT AND A HOT SHOE MOUNT

(71) Applicant: Julius Inc., Rancho Cucamonga, CA (US)

(72) Inventor: Il Kim, Rancho Cucamonga, CA (US)

(73) Assignee: JULIUS INC., Rancho Cucamonga, CA (US)

( * ) Notice: Subject to any disclaimer, the term of this patent is extended or adjusted under 35 U.S.C. 154(b) by 133 days.

(21) Appl. No.: 15/072,569

(22) Filed: Mar. 17, 2016

(65) Prior Publication Data

US 2017/0075194 A1  Mar. 16, 2017

Related U.S. Application Data

(63) Continuation-in-part of application No. 29/539,274, filed on Sep. 11, 2015, now Pat. No. Des. 771,297.

(51) Int. Cl.
  *G03B 15/05* (2006.01)
  *G03B 15/06* (2006.01)
  *F21V 21/116* (2006.01)
  *F21V 17/00* (2006.01)

(52) U.S. Cl.
  CPC ............ *G03B 15/05* (2013.01); *F21V 17/002* (2013.01); *F21V 21/116* (2013.01); *G03B 15/06* (2013.01)

(58) Field of Classification Search
  CPC .................. G03B 2215/0514–2215/056; G03B 2215/0567; G03B 2215/0571; G03B 2215/0582–2215/0596; G03B 15/02; G03B 15/05; G03B 15/06; F21V 7/18; F21V 21/06; F21V 21/116; F21V 19/003; F21V 19/004; F21V 19/0055; F21V 17/002; F21V 17/005; F21V 17/06; F21V 17/08; F21V 17/12; F21V 17/14; F21V 17/18; F21S 6/005–6/008; A45B 2200/1018; A45B 9/02
  See application file for complete search history.

(56) References Cited

U.S. PATENT DOCUMENTS

| 4,443,837 A * | 4/1984 | Migliori | F16M 11/043 362/16 |
| 2013/0120960 A1 * | 5/2013 | Harooni | G03B 15/06 362/16 |

* cited by examiner

*Primary Examiner* — Anh Mai
*Assistant Examiner* — Steven Horikoshi

(57) ABSTRACT

An adjustable light fixture for photography that is versatile in mobility and utility. The light fixture includes a light socket, a handle, an umbrella-mounting hole, a hot shoe mount, a stand adaptor, and a lockable pivot joint. The light socket receives a light bulb and includes a housing and an electrical interfacing cavity. The intermediate spar is adjacently connected to the housing to connect the handle to the light socket. The electrical interfacing cavity traverses into the housing, opposite the intermediate spar. The handle is adjacently and perpendicularly connected to the intermediate spar, opposite the housing. The umbrella-mounting hole traverses through the handle, oriented parallel to a main axis of the electrical interfacing cavity. The hot shoe mount is adjacently connected to the intermediate spar, opposite the handle. The stand adaptor is pivotably attached to the handle by the lockable pivot joint, opposite the intermediate spar.

18 Claims, 4 Drawing Sheets

ADJUSTABLE LIGHT FIXTURE WITH AN UMBRELLA MOUNT AND A HOT SHOE MOUNT

FIELD OF THE INVENTION

The present invention relates generally to photography accessories. More specifically, the present invention is an adjustable light fixture which includes an umbrella mount, a hot shoe mount, and a stand adaptor.

BACKGROUND OF THE INVENTION

Lighting is one of the most important aspects in cinema and photography. The type of lighting used for a photoshoot or a recording directly affects the quality of the resulting end product. The proper implementation of light can mean the difference between a good quality and a mediocre picture. A variety of aspects contribute to different type of lighting including light angle, lighting intensity, natural light, and artificial light. In order to manipulate these aspects, personnel in the field utilize different lighting sources and light manipulation devices. Two of the main lighting sources is a light bulb and an electronic flash unit. The light bulb provides a constant stream of light and a variety of different light bulbs may be used to vary said light depending on the needs of the user. The electronic flash unit produces an artificial light for an extremely short amount of time at a high temperature. This is used to illuminate a dark scene. The light produces by these lighting sources may be altered and modified by a lighting umbrella. A lighting umbrella is reflector which utilizes a reflective surface to modify light produces by a lighting source. A lighting umbrella may be used to diffuse, soften, redirect, or focus light; essential for illuminating a variety of scenes and creating quality photos. Conventional photo/video light sources are broadly divided into 4 types, tungsten, fluorescent, flash, and light-emitting diodes (LEDs). Tungsten and fluorescent based light sources offer not only lower power but also poor portability due to fragile nature of the bulb. Flash based light sources offer higher power but due to its size and weight, its portability is poorly rated. LED lights provide 10 times higher output than conventional tungsten photo/video light source at equal wattage, yet consumes significantly less energy. The present invention offers high power, robust construction, and minimal weight as a perfect for studio or location assignments.

The present invention provides allows for the combination of light sources and light manipulation devises in a single, easy to use device. The present invention is a light fixture which includes a light socket, a hot shoe mount, and an umbrella mount. The light socket allows for the present invention to utilize various photographic bulbs. The hot shoe mount allows the present invention to utilize various photographic accessories such as electronic flash units. The umbrella mount allows the present invention to utilize a variety of lighting umbrellas to manipulate and redirect light. Additionally, the present invention includes a handle and a stand adaptor for increased versatility. With the ability to use both an LED bulb and an external camera flash the present invention forms a complete flash light source with high wattage LED modeling bulb which can be used simultaneously as a continuous LED light source. This creates a light source of flash and continuous lighting within the same color temperature spectrum.

The present invention utilizes LED light sources and therefore can perform under the 85 volts to 240 volts, thus compatible in countries such as Europe and Asia with higher voltage, where conventional tungsten, fluorescent, or flash light sources cannot. Additionally, when combined with 12 volt LED bulbs, the present invention can perform on a small 12 volt battery pack that are commercially available in the photo/video industry. The LED light portion of the present invention works as the modeling light of the external flash unit on the hotshoe portion, resulting in a complete flash light source with higher wattage modeling light in a portable format.

DETAIL DESCRIPTIONS OF THE INVENTION

All illustrations of the drawings are for the purpose of describing selected versions of the present invention and are not intended to limit the scope of the present invention.

The present invention generally relates to lighting fixtures and photography accessories. In particular, the present invention is a lighting fixture with a variety of integrated features that allow a user to produce, redirect, and manipulate light. Integrated features include, but are not limited to, a flash shoe adaptor, a lighting umbrella adaptor, and a light-bulb socket. The present invention supports light emitting diode (LED) modeling bulbs that are high in lumen and kelvin, up to 5500 kelvin, while traditional fixtures that use incandescent and halogen bulbs only reach a color temperature of about 3000 kelvin. In addition, the present invention may be either connected to a light stand or hand held, thus increasing its versatility.

Figure 1:
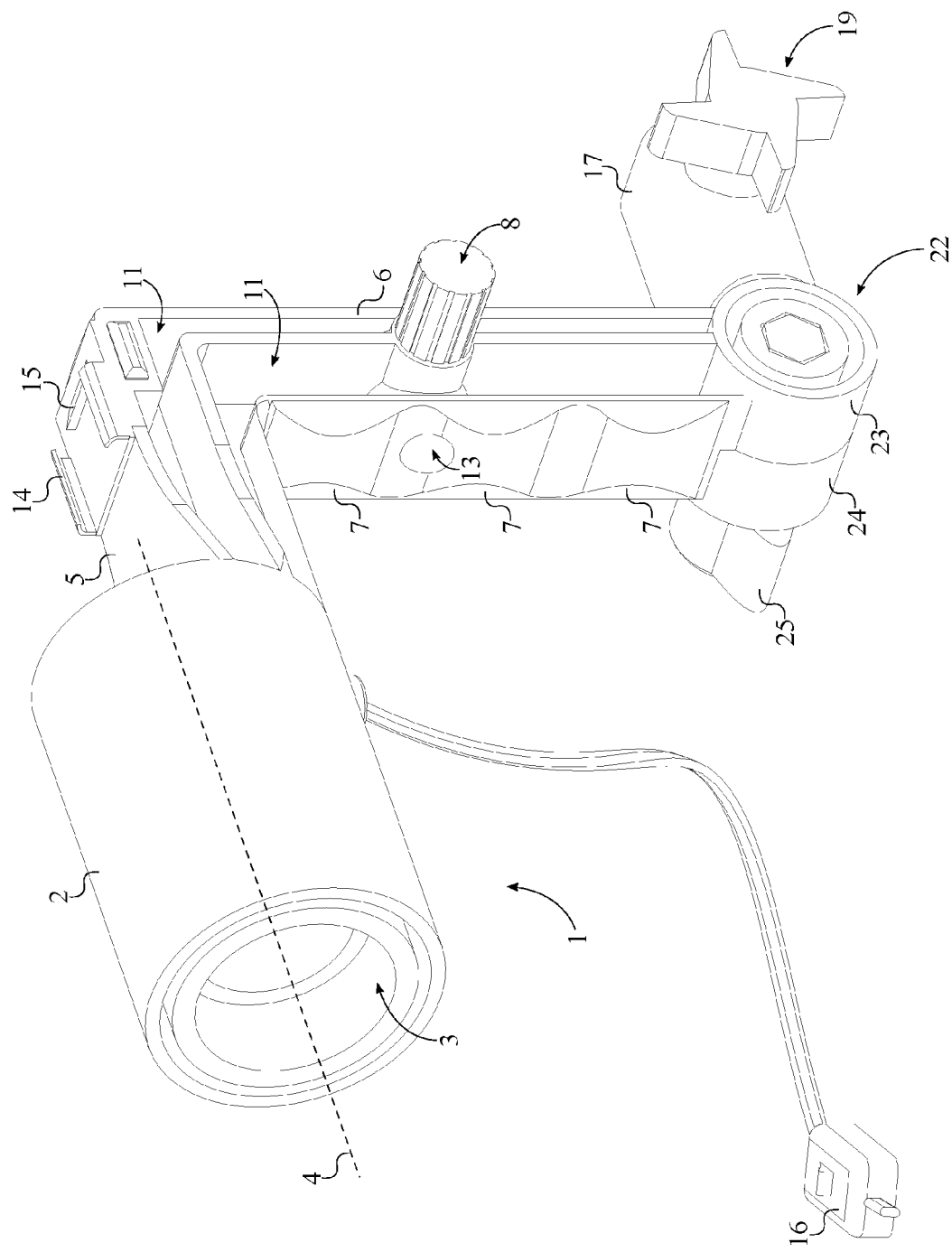
FIG. 1 is a perspective view of the present invention.

Referring to FIG. 1, the present invention comprises a light socket 1, an intermediate spar 5, a handle 6, an umbrella-mounting hole 13, a hot shoe mount 14, a stand adaptor 17, and a lockable pivot joint 22. The light socket 1 allows for the attachment of a variety of different light bulbs to the present invention in order to act as a light source. More specifically, the light socket 1 serves as an electrical and a physical connection for the light bulb and thus comprises a housing 2 and an electrical interfacing cavity 3. The housing 2 is preferably of a cylindrical design as the majority of light bulbs on the market have a circular cross-section. The intermediate spar 5 connects the light socket 1 to the handle 6 and facilitates the placement of the hot shoe mount 14. The intermediate spar 5 is adjacently connected to the housing 2. The electrical interfacing cavity 3 traverses into the housing 2, opposite the intermediate spar 5. This places the light bulb partially or fully within the housing 2, thus providing protection for the light bulb while also partially directing the light produced by the light bulb. The electrical interfacing cavity 3 preferably includes a threaded region to receive and hold the light bulb as well as the necessary components required to transfer electrical energy to the light bulb from an external or internal power source. The preferred power source is external, in particular an external switch 16 that is connected to an outlet. The external switch 16 is electrically connected to the electrical interfacing cavity 3 and allows the user to turn on and off the light bulb connected to the present invention.

The handle 6 provides the user with a means to hold and manipulate the present invention. The handle 6 is adjacently and perpendicularly connected to the intermediate spar 5, opposite the housing 2. For increased usability, the handle 6 is shaped and sized to the contours of the average hand size. Integrated into the handle 6 is an umbrella-mounting hole 13 that allows a lighting umbrella to be attached to the present invention. The lighting umbrella allows the user to redirect, soften, and focus the light produced by the light bulb or any other light source that may be attached to the present invention. In particular, the umbrella-mounting hole 13 traverses through the handle 6, oriented parallel to a main axis 4 of the electrical interfacing cavity 3. This positions the lighting umbrella directly in front or behind the light socket 1. When positioned in front of the light socket 1, the lighting umbrella effects and alters the light produced by the light bulb. When positioned behind the light bulb, the lighting umbrella effects the light produced by the lighting accessory that is attached to the hot shoe mount 14. The hot shoe mount 14 is adjacently connected to the intermediate spar 5, opposite the handle 6, and allows for the attachment of other lighting accessories, such as electronic flash units. A retractable stop 15 is used to prevent accessories from disengaging from the hot shoe mount 14. The retractable stop 15 is positioned adjacent to the hot shoe mount 14, opposite the housing 2, and is adjacently integrated into the intermediate spar 5. The retractable stop 15 is released through the use of a release button that is integrated into the side of the handle 6. When the accessory is inserted into the hot shoe mount 14 the retractable stop 15 is pushed down in order to allow the accessory to fit inside the hot shoe mount 14. Pressing the release button will lower the retractable stop 15 so the user may remove the accessory. In an alternative embodiment of the present invention, the retractable stop 15 is positioned in between the hot shoe mount 14 and the housing 2 with the release button being integrated into the intermediate spar 5 directly underneath the retractable stop 15. Furthermore, additional alternative locations may be implemented to suit various user needs.

Figure 4:
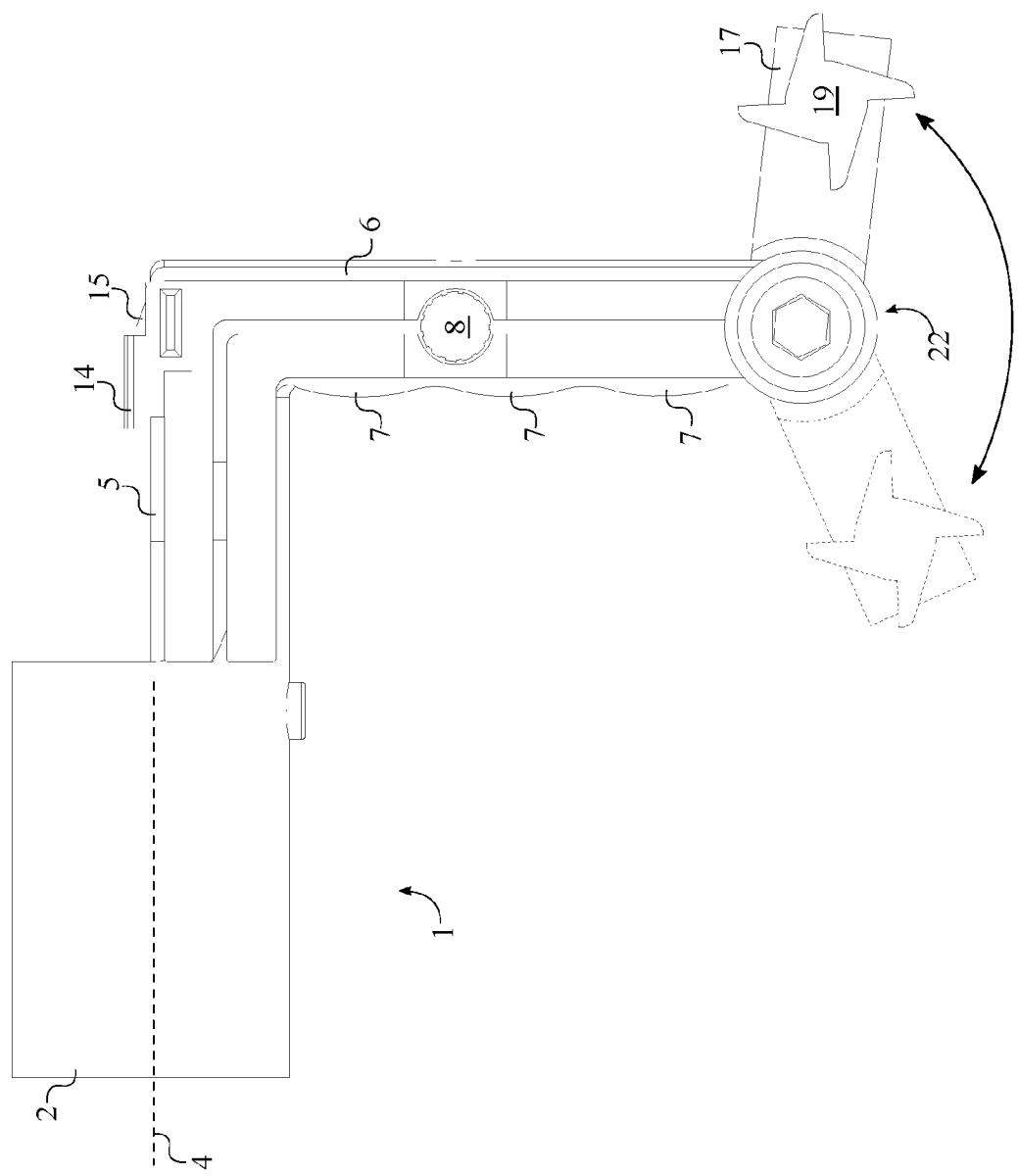
FIG. 4 is a left side view of the present invention without the external switch.

The stand adaptor 17 allows the present invention to be attached to a light stand in order to vary its vertical position as well as its angular orientation. The stand adaptor 17 is positioned adjacent to the handle 6, opposite the intermediate spar 5. In order to allow for the varying degree of orientation for the present invention, the stand adaptor 17 is pivotably attached to the handle 6 by the lockable pivot joint 22. Referring to FIG. 4, the lockable pivot joint 22 allows the handle 6, the intermediate spar 5, and the light socket 1 to rotate relative to the stand adaptor 17, further allowing the user to alter the lighting characteristic to his or her preferences. The lockable pivot joint 22 comprises a ratchet female pivot lock 23, a ratchet male pivot lock 24, and a bolt-nut clamp 25. The ratchet female pivot lock 23 is adjacently connected to the handle 6, opposite the intermediate spar 5. Similarly, the ratchet male pivot lock 24 is adjacently connected to the stand adaptor 17, opposite the stand-receiving cavity 18. The ratchet female pivot lock 23 and the ratchet male pivot lock 24 are torsionally engaged to each other in order to lock the present invention into various configurations, in particular orientations as seen in FIG. 4. More specifically, the ratchet male pivot lock 24 and the ratchet female pivot lock 23 share a rotational axis by the bolt-nut clamp 25.

In the unlocked configuration, the ratchet male pivot lock 24 and the ratchet female pivot lock 23 are able to rotate about the bolt axis, relative to each other. In the locked configuration, the ratchet male pivot lock 24 is pressed against the ratchet female pivot lock 23 by the bolt-nut clamp 25. The ratchet female pivot lock 23 and the ratchet male pivot lock 24 each preferably are a circular extrusion of equal size with groove-protrusion interlocking features to ensure a secure lock in between the two components. The ratchet female pivot lock 23 preferably contains indentations and the ratchet male pivot lock 24 preferably contains protrusions. The indentations are shaped to receive the protrusions in a flush fit. Furthermore, the bolt-nut clamp 25 contains an ergonomic endcap which allows the user to more easily rotate the bolt relative to the nut in order to position the lockable pivot joint 22 into the locked configuration or unlocked configuration. In alternative embodiments of the present invention, various alternative mechanisms may be used for the lockable pivot joint 22.

To create a more ergonomic and light weight apparatus, the present invention further utilizes a plurality of ergonomic ridges 7, a plurality of first recessions 11, and a plurality of second recessions 12. Referring to FIG. 4, the plurality of ergonomic ridges 7 is equally distributed along the handle 6 with each of the plurality of ergonomic ridges 7 being integrated into the handle 6. This design yields a more ergonomic physical interface for the user's hand. The plurality of first recessions 11 and the plurality of second recessions 12 cut out large portions of the handle 6 and the intermediate spar 5 in order to decrease the overall weight of the present invention without compromising the structural integrity. Each of the plurality of first recessions 11 traverses into the intermediate spar 5 and the handle 6, preferably along the length of the two components. In a similar fashion, each of the plurality of second recessions 12 traverses into the intermediate spar 5 and the handle 6, opposite the plurality of first recessions 11 as seen in FIG. 2 and FIG. 3.

Figure 2:
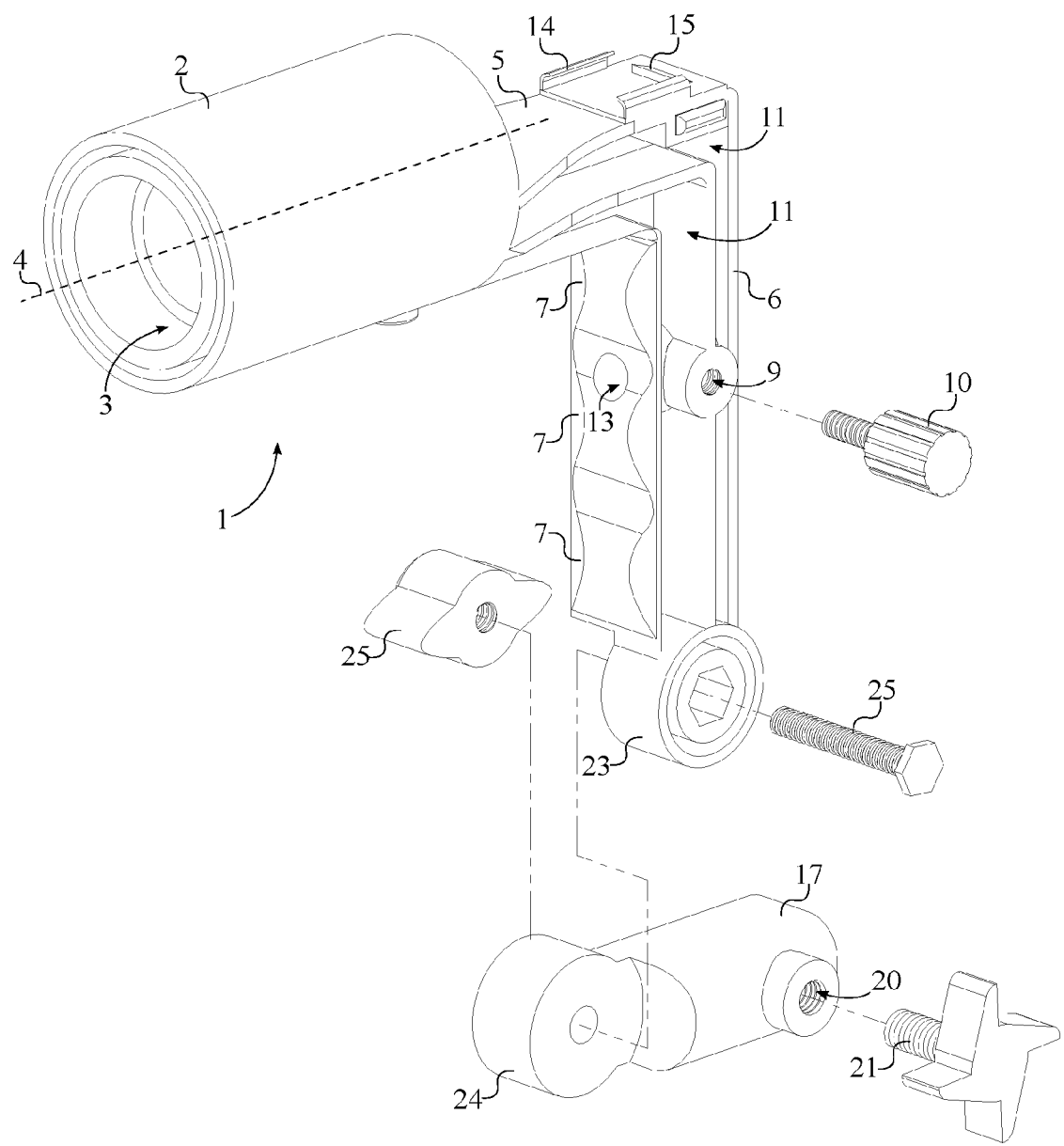
FIG. 2 is an exploded perspective view of the present invention without the external switch.

Referring to FIG. 2, a first locking mechanism 8 is used in order to secure and release a lighting umbrella to and from the present invention. The first locking mechanism 8 is mechanically integrated into the handle 6 and the umbrella-mounting hole 13. More specifically, the first locking mechanism 8 preferably comprises a first threaded hole 9 and a first screw 10. The first threaded hole 9 traverses into the handle 6, laterally intersecting the umbrella-mounting hole 13. Once the lighting umbrella is positioned within the umbrella-mounting hole 13, the first screw 10 is engaged, screwed in, to the first threaded hole 9 until the first screw 10 engages and locks the lighting umbrella to the handle 6. In particular, the first screw 10 is engaged to the threaded region of the first threaded hole 9. Clockwise rotation translates the first screw 10 further into the umbrella-mounting hole 13 and vice versa.

Figure 3:
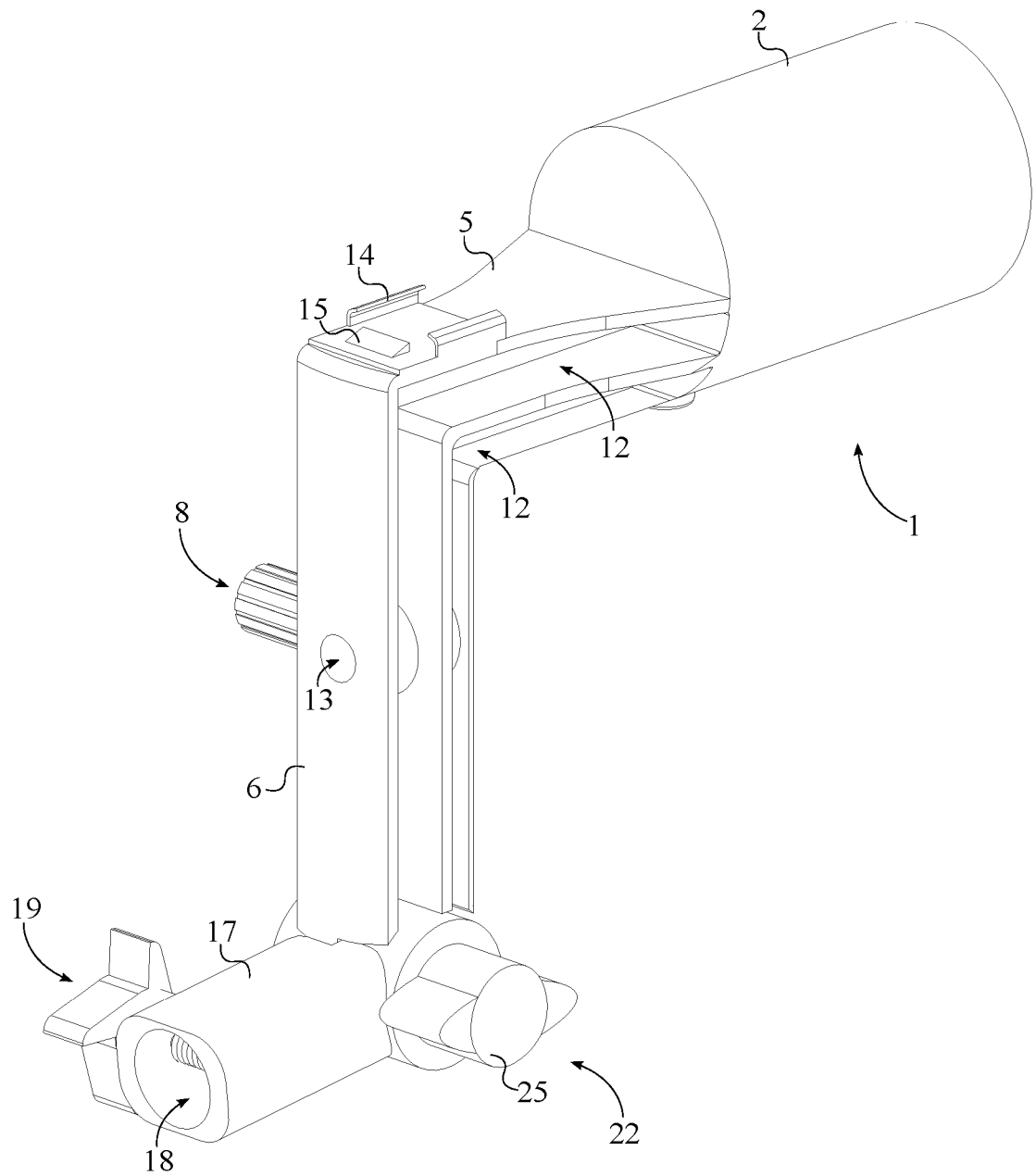
FIG. 3 is an alternative exploded perspective view of the present invention without the external switch.

A variety of mechanisms may be used for the stand adaptor 17 component to couple the present invention to external structures, such as a lighting stand, but the preferred method is through the use of a stand-receiving cavity 18 and a second locking mechanism 19 as seen in FIG. 3. The stand-receiving cavity 18 traverses into the stand adaptor 17, opposite the handle 6, and is sized and shaped to receive a mounting shaft of a lighting stand. The second locking mechanism 19 is mechanically integrated into the stand-receiving cavity 18 and the stand adaptor 17 in order to secure the mounting shaft of the lighting stand to the stand adaptor 17. The preferred second locking mechanism 19 comprises a second threaded hole 20 and a second screw 21. The second threaded hole 20 traverses into the stand adaptor 17, intersecting the stand-receiving cavity 18. Once the mounting shaft is positioned within the stand-receiving cavity 18, the second screw 21 is engaged, screwed in, to the second threaded hole 20 until the screw engages and pushes the mounting shaft against the sidewall of the stand-receiving cavity 18, thus securing the mounting shaft to the stand adaptor 17. More specifically, the second screw 21 is engaged to the threaded region of the second threaded hole 20. Clockwise rotation translates the second screw 21 further into the stand-receiving cavity 18 and vice versa.

Although the invention has been explained in relation to its preferred embodiment, it is to be understood that many other possible modifications and variations can be made without departing from the spirit and scope of the invention as hereinafter claimed.

What is claimed is:

1. An adjustable light fixture with an umbrella mount and a hot shoe mount comprises:
   a light socket;
   an intermediate spar;
   a handle;
   an umbrella-mounting hole;
   a hot shoe mount;
   a stand adaptor;
   a lockable pivot joint;
   the light socket comprises a housing and an electrical interfacing cavity;
   the intermediate spar being adjacently connected to the housing;
   the electrical interfacing cavity traversing into the housing, opposite the intermediate spar;
   the handle being adjacently and perpendicularly connected to the intermediate spar, opposite the housing;
   the umbrella-mounting hole traversing through the handle;
   the umbrella-mounting hole being oriented parallel to a main axis of the electrical interfacing cavity;
   the stand adaptor being adjacently positioned to the handle, opposite the intermediate spar;
   the stand adaptor being pivotably attached to the handle by the lockable pivot joint; and
   the hot shoe mount being adjacently connected to the intermediate spar, opposite the handle.

2. The adjustable light fixture with an umbrella mount and a hot shoe mount as claimed in claim 1 comprises:
   a plurality of ergonomic ridges;
   the plurality of ergonomic ridges being distributed along the handle; and
   each of the plurality of ergonomic ridges being integrated into the handle.

3. The adjustable light fixture with an umbrella mount and a hot shoe mount as claimed in claim 1 comprises:
   a first locking mechanism; and
   the first locking mechanism being mechanically integrated between the handle and the umbrella-mounting hole.

4. The adjustable light fixture with an umbrella mount and a hot shoe mount as claimed in claim 3 comprises:
   the first locking mechanism comprises a first threaded hole and a first screw;
   the first threaded hole traversing into the handle;
   the first threaded hole laterally intersecting the umbrella-mounting hole; and
   the screw being engaged to the first threaded hole.

5. The adjustable light fixture with an umbrella mount and a hot shoe mount as claimed in claim 1 comprises:
   a stand-receiving cavity;
   a second locking mechanism;
   the stand-receiving cavity traversing into the stand adaptor, opposite the lockable pivot joint; and
   the second locking mechanism being mechanically integrated between the stand-receiving cavity and the stand adaptor.

6. The adjustable light fixture with an umbrella mount and a hot shoe mount as claimed in claim 5 comprises:
   the second locking mechanism comprises a second threaded hole and a second screw;
   the second threaded hole laterally traversing into the stand adaptor;
   the second threaded hole laterally intersecting the stand-receiving cavity; and
   the second screw being engaged to the second threaded hole.

7. The adjustable light fixture with an umbrella mount and a hot shoe mount as claimed in claim 1 comprises:
   a retractable stop;
   the retractable stop being positioned adjacent to the hot shoe mount, opposite the housing; and
   the retractable stop being adjacently integrated into the intermediate spar.

8. The adjustable light fixture with an umbrella mount and a hot shoe mount as claimed in claim 1 comprises:
   a plurality of first recessions;
   a plurality of second recessions;
   each of the plurality of first recessions traversing into the intermediate spar and the handle; and
   each of the plurality of second recessions traversing into the intermediate spar and the handle, opposite the plurality of first recessions.

9. The adjustable light fixture with an umbrella mount and a hot shoe mount as claimed in claim 1 comprises:
   an external switch; and
   the external switch being electrically connected to the electrical interfacing cavity.

10. An adjustable light fixture with an umbrella mount and a hot shoe mount comprises:
    a light socket;
    an intermediate spar;
    a handle;
    an umbrella-mounting hole;
    a hot shoe mount;
    a stand adaptor;
    a lockable pivot joint;
    the light socket comprises a housing and an electrical interfacing cavity;
    the lockable pivot joint comprises a ratchet female pivot lock, a ratchet male pivot lock, and a bolt-nut clamp;
    the intermediate spar being adjacently connected to the housing;
    the electrical interfacing cavity traversing into the housing, opposite the intermediate spar;
    the handle being adjacently and perpendicularly connected to the intermediate spar, opposite the housing;
    the umbrella-mounting hole traversing through the handle;
    the umbrella-mounting hole being oriented parallel to a main axis of the electrical interfacing cavity;
    the stand adaptor being adjacently positioned to the handle, opposite the intermediate spar;
    the stand adaptor being pivotably attached to the handle by the lockable pivot joint;
    the hot shoe mount being adjacently connected to the intermediate spar, opposite the handle;
    the ratchet female pivot lock being adjacently connected to the handle, opposite the intermediate spar;
    the ratchet male pivot lock being adjacently connected to the stand adaptor, opposite the stand-receiving cavity;

the ratchet female pivot lock and the ratchet male pivot lock being torsionally engaged to each other; and the ratchet male pivot lock being pressed against the ratchet female pivot lock by the bolt-nut clamp.

11. The adjustable light fixture with an umbrella mount and a hot shoe mount as claimed in claim 10 comprises:

a plurality of ergonomic ridges;

the plurality of ergonomic ridges being distributed along the handle; and each of the plurality of ergonomic ridges being integrated into the handle.

12. The adjustable light fixture with an umbrella mount and a hot shoe mount as claimed in claim 10 comprises:

a first locking mechanism; and the first locking mechanism being mechanically integrated between the handle and the umbrella-mounting hole.

13. The adjustable light fixture with an umbrella mount and a hot shoe mount as claimed in claim 12 comprises:

the first locking mechanism comprises a first threaded hole and a first screw;

the first threaded hole traversing into the handle;

the first threaded hole laterally intersecting the umbrella-mounting hole; and the screw being engaged to the first threaded hole.

14. The adjustable light fixture with an umbrella mount and a hot shoe mount as claimed in claim 10 comprises:

a stand-receiving cavity;

a second locking mechanism;

the stand-receiving cavity traversing into the stand adaptor, opposite the lockable pivot joint; and the second locking mechanism being mechanically integrated between the stand-receiving cavity and the stand adaptor.

15. The adjustable light fixture with an umbrella mount and a hot shoe mount as claimed in claim 14 comprises:

the second locking mechanism comprises a second threaded hole and a second screw;

the second threaded hole laterally traversing into the stand adaptor;

the second threaded hole laterally intersecting the stand-receiving cavity; and the second screw being engaged to the second threaded hole.

16. The adjustable light fixture with an umbrella mount and a hot shoe mount as claimed in claim 10 comprises:

a retractable stop;

the retractable stop being positioned adjacent to the hot shoe mount, opposite the housing; and the retractable stop being adjacently integrated into the intermediate spar.

17. The adjustable light fixture with an umbrella mount and a hot shoe mount as claimed in claim 10 comprises:

a plurality of first recessions;

a plurality of second recessions;

each of the plurality of first recessions traversing into the intermediate spar and the handle; and each of the plurality of second recessions traversing into the intermediate spar and the handle, opposite the plurality of first recessions.

18. The adjustable light fixture with an umbrella mount and a hot shoe mount as claimed in claim 10 comprises:

an external switch; and the external switch being electrically connected to the electrical interfacing cavity.

* * * * *